Aug. 25, 1953

J. SISHC 2,649,678

DISK TYPE POTATO VINE CUTTER

Filed Dec. 30, 1949

3 Sheets-Sheet 1

INVENTOR.
JULIUS SISHC
BY
ATTORNEY

Aug. 25, 1953 J. SISHC 2,649,678
DISK TYPE POTATO VINE CUTTER
Filed Dec. 30, 1949 3 Sheets-Sheet 2

INVENTOR.
JULIUS SISHC
BY
ATTORNEY

Aug. 25, 1953 J. SISHC 2,649,678
DISK TYPE POTATO VINE CUTTER
Filed Dec. 30, 1949 3 Sheets-Sheet 3
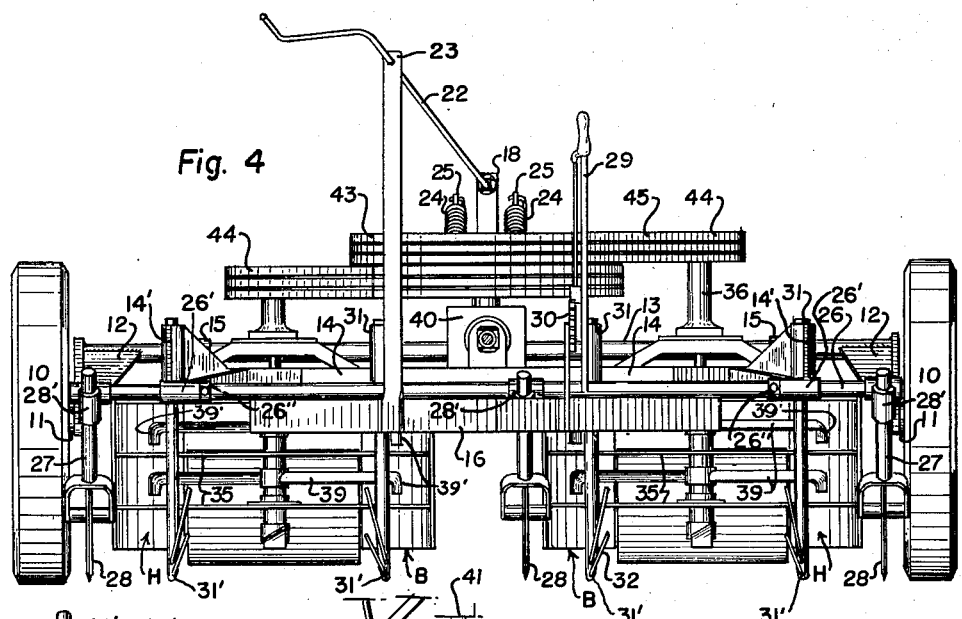
Fig. 4
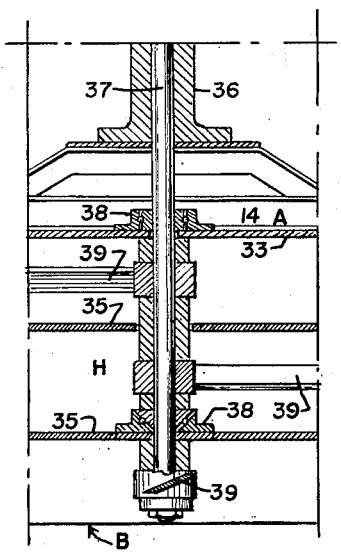
Fig. 6
Fig. 5
INVENTOR.
JULIUS SISHC
BY
ATTORNEY Patented Aug. 25, 1953

2,649,678

UNITED STATES PATENT OFFICE 2,649,678

DISK TYPE POTATO VINE CUTTER

Julius Sishc, Torrington, Wyo.

Application December 30, 1949, Serial No. 135,866

10 Claims. (Cl. 56—25.4)

This invention relates to apparatus for power translation along and simultaneous power actuation relative to the top growth of row crops in the field for the clearing and cutting away of such top growth to facilitate harvest of the crop, and more particularly to such apparatus effective to clear and cut away potato vines preliminary to the harvesting of the associated root crop, and has as an object to provide a novel and improved unitary implement operable to the ends set forth in powered association with a conventional tractor.

A further object of the invention is to provide a novel and improved construction and arrangement of elements constituting a potato vine cutter operable in conjunction with and as an attachment to a conventional tractor.

A further object of the invention is to provide a novel and improved construction, mounting, and drive for multiblade, power-rotatable knives in a potato vine cutter.

A further object of the invention is to provide a novel and improved adjustable mounting for and a selectively-variable interrelation of the operating elements comprised in a potato vince cutter.

A further object of the invention is to provide an improved potato vine cutter that is sturdy and compact in a unitary, two-wheel trailer embodiment, facile of operative association with or separation from a powering tractor, fully adjustable to meet all variations in operating conditions, and efficient in the attainment of the ends for which designed.

Figure 1:
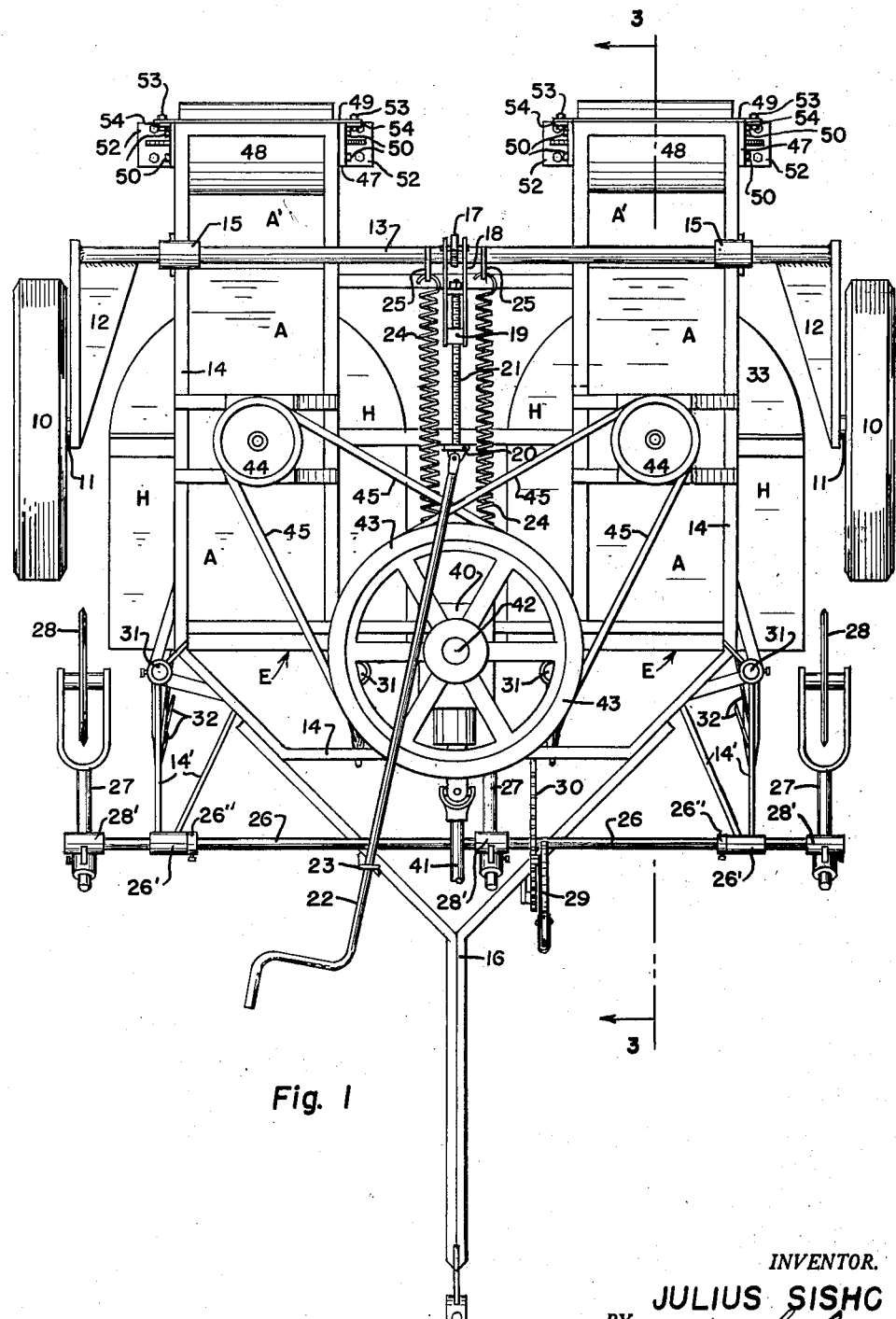
Figure 2:
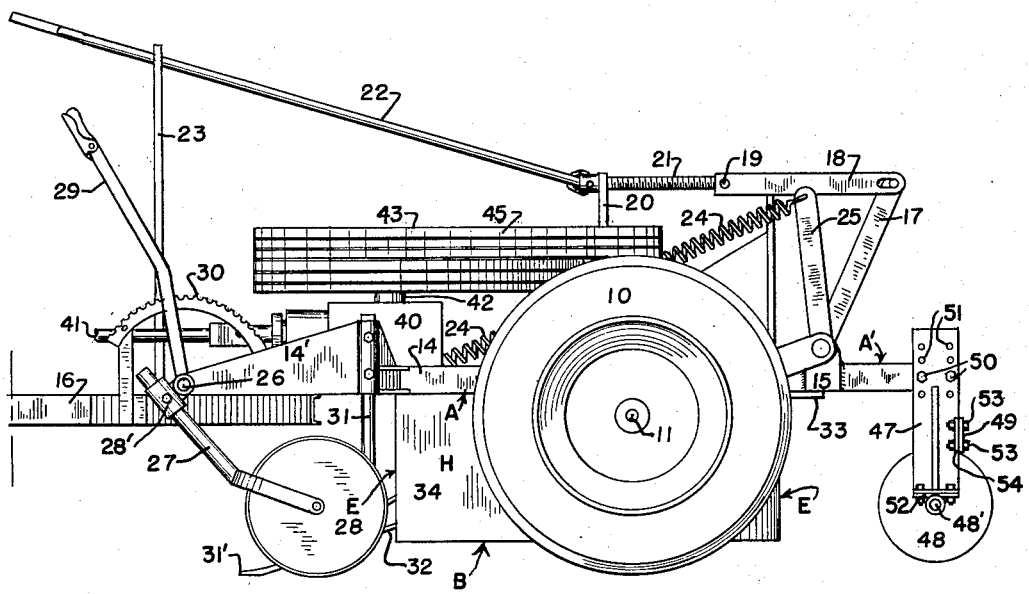
Figure 3:
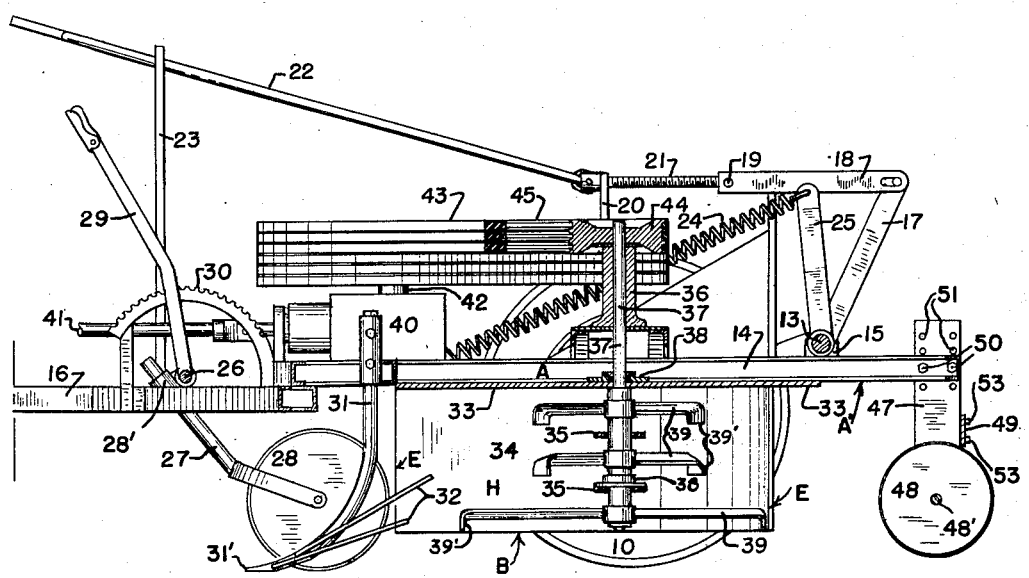

With the foregoing and other objects in view, my invention consists in the construction, arrangement, and combination of elements as hereinafter set forth, pointed out in my claims, and illustrated by the accompanying drawings, in which:

Figure 1 is a top plan view of a typical, two-row embodiment of the invention. Figure 2 is a side elevation of the arrangement according to Figure 1, certain forward elements of the latter being broken away to conserve space. Figure 3 is a section taken substantially on the indicated line 3—3 of Figure 1. Figure 4 is a front elevation of the arrangement according to Figure 1. Figure 5 is a half bottom plan view of the organization according to Figure 4. Figure 6 is a fragmentary, detail section, on an enlarged scale, taken axially through a knife assembly and associated mounting employed in duplicate in the apparatus as illustrated.

As is well known, the harvesting of potatoes and analogous crops customarily grown in rows is very much facilitated by a preliminary chopping and clearing of the much-entangled, vine-type, top growth characteristic of such crops, and the instant invention is hence directed to the provision of improved apparatus effectively and efficiently power operable to such end.

The improved apparatus is supported by and mounted for translation on a single pair of like, spacedly-parallel wheels 10 each independently and freely revoluble about a spindle 11 fixedly outstanding from an end of a rigid yoke-frame 12 whereof the base member 13 is of a length to span over two rows of the crop to be worked and is disposed in spacedly parallel offset relation with the aligned axes of the spindles 11 and hence transverse to the line of apparatus travel. A flat, rigid, skeleton frame 14 is formed with bays adapted to register over the crop rows and is hinged at its rearward portion, as by means of journal hangers 15, to and for oscillation through a vertical arc about the base member 13 of the yoke-frame 12 to dispose the major portion of said frame 14 forwardly in the direction of apparatus travel from said base member, and forward elements of said frame 14 converge to rigid connection with a hitch bar 16 extending forwardly from and on the longitudinal median line of the associated frame and adapted for engagement of its free end with the draw-bar of a tractor. The angular relationship betwen the plane of the yoke-frame 12 and the plane of the frame 14 is susceptible of adjustment and regulation to selectively control and determine the altitudinal spacing of the frame 14 major portion relative to the wheel-engaged ground surface when the hitch bar 16 is tractor-connected, to which end an arm 17 fixedly upstanding from the midlength of the base member 13 hingedly connects at its free end with the rearward end of a yoke 18 which carries a bored and internally-threaded swivel block 19 on its forward end. An arm 20 fixed to and upstanding on the longitudinal median line from an intermediate portion of the frame 14 is apertured adjacent its free end to rotatably mount a screw 21 held therein against axial displacement, and said screw 21 operatively engages with and through the block 19 so that rotation of the screw is reflected, according to the direction of such rotation, as yoke 18 travels toward or away from the arm 20 and consequent oscillation of the base member 13 in the journal hangers 15, so that, the wheels mounting the yoke-frame 12 being ground-engaged, said base member carrying the frame 14 is correspondingly elevated or lowered. A crank handle 22 swiveled to the forward end of the screw 21 and extended forwardly of the apparatus above the frame 14 through a guide 23 rising from said frame is provided as a convenient means for manual rotation of said screw and consequent adjustment of the angle between the frame 14 plane and that of the yoke-frame 12. To facilitate the adjustment just described, to relieve to some extent the load on the screw 21 and associated elements, and to counter-balance a portion of the frame 14 weight forwardly of the base member 13, contractile springs 24 operatively engage between upper ends of arms 25 fixedly upstanding from said base member 13 on opposite sides of the arm 17 and points of the frame 14 forwardly of the arm 20.

Journaled for oscillation in bearings 26' carried by the forward portion 16' of the frame 14, a rock-shaft 26 is disposed transversely of said frame forward portion to parallel the base member 13 and axis of the spindles 11 well in advance of the latter, said shaft being held against axial displacement by means of stop collars 26" on and engaged with the shaft to abut inner ends of the bearings 26', and the arms 27 of rolling coulters 28 are secured by means of fittings 28' engaged with the rock-shaft 26 to and in spaced relation along said rock-shaft 26 to dispose the coulters in spaced parallelism with the line of apparatus travel and with each other and in trailing relation with their mounting in a disposition providing a coulter for vine and top growth cutting travel along each side of and between the two crop rows spanned by the apparatus, three such coulters being employed in the two-row embodiment illustrated. Adjustment of the coulters 28 into desired engagement with the ground in any tractor-hitched attitude of the frame 14 is had through the agency of a lever 29 fixedly upstanding from the rock-shaft 26 in selectively-latchable relation with a toothed segment 30 fixed to the frame 14, rocking of said shaft in its mounting bearings by means of said lever being reflected as corresponding arcuate travel of the coulters toward and away from the ground surface.

Stems 31 fixedly depending from the frame 14 spacedly adjacent inner sides of the outer coulters 28 and on each side of the central coulter 28, and hence disposed to travel along the sides of the two crop rows spanned by the apparatus, curve forwardly at their lower ends to terminate in points 31' directed in the line of apparatus travel and disposed for approximate engagement with the ground surface when the apparatus is tractor-hitched, the altitudinal adjustment of the frame 14 above described being available to regulate and control the attitude of the points 31' of the stems 31 relative to the ground, and tines 32 are fixed in spaced relation to and to trail rearwardly from each stem 31 adjacent its point in a lateral inclination, or rearward convergence, effective to lift and move the crop row top growth engaged by said points from the line of coulter severance and toward the center of the crop row in an elevation of such growth which introduces it to the operating orbit of the knives hereinafter described.

The bays A of the frame 14 adapted to travel over and in registration above the crop rows are closed by means of plates 33 secured against the underside of the pertinent frame elements and skirts 34, of sheet material, depend from the side margins of said plates 33 and converge at their rearward ends to complete partial housings H, closed at their tops and sides and open at their bottoms B and ends E, whereof the side skirts trail the stems 31 and coulters 28 with their leading margins registered in the zone between each stem 31 and the laterally-adjacent coulter, and wherein the cutting elements of the apparatus are operatively mounted.

Each of the partial housings comprised from a plate 33 and its associated skirts 34 is laterally traversed by a pair of like, flat bars 35 fixedly bridging in altitudinally spaced relation and in spaced parallelism with the frame 14 between the skirt elements 34 with their lengths perpendicular to the line of apparatus travel, and a journal bearing 36 is fixed to, in axially perpendicular relation with the plane of, and to upstand above the frame 14 in registration of its projected axis with the centers of the bars 35. The bars 35 are suitably apertured in registration with the bore of the bearing 36 and a shaft 37 is mounted for rotation in said bearing and in extension in perpendicular relation with the frame 14 plane through the apertures of said bars to termination at its lower end in ground-clearing relation beneath the lower of the bars 35, suitable thrust bearings 38 on the plate 33 or frame 14 and on the lower of the bars 35 cooperating with the bearing 36 to rotatably mount and support said shaft; it being manifest that a shaft 37 is provided in each of the bays A of the frame 14 disposed to travel in superposed registration with a crop row and that the disposition of said shafts is such as to substantially register each of the shafts for travel along and above the center line of one of the crop rows spanned by the apparatus. Fixed to the lower end of each shaft 37 and to the shaft portions intercepted between the bars 35 and between the upper of said bars and the plate 33, diametric knives 39, conveniently alike in a construction preferably including angularly-related, downwardly-projected terminal portions 39', are mounted for rotation with said shaft in altitudinally-spaced planes paralleling and beneath that of the frame 14, said knives being of a uniform length slightly less than the span between the skirts 34 of the partial housing wherein they are designed to operate and preferably being uniformly offset or spaced angularly about their common shaft 37. When the shafts 37 and their associated knives 39 are rotated at suitable speed during forward translation of the apparatus along crop rows in a field, vine material and top growth side-severed by the coulters 28 and elevated and directed into the partial housings between the skirts 34 by the points 31' of the stems 31 and tines 32 as an incident of apparatus travel is caught and chopped by the rotating knives as the latter pass with a scissors-like action adjacent the fixed bars 35, thus not only releasing such material from its ground attachment but also cutting and dividing the material for redeposit on the ground behind the apparatus in the form of short, non-entangled fragments and sections which in no way impede the ultimate crop harvest and which may be easily raked away, if desired.

The shafts 37 and their associated knives are power-rotated by and from the tractor towing the apparatus through the agency of the power take-off with which tractors are conventionally equipped, to which end a gear transmission 40, of any appropriate type and construction, is mounted on and above a forward, central portion of the frame 14 and is served for power input thereto by a telescopic, suitably-jointed shaft 41 connectible in a usual manner with the tractor power take-off in forward extension from the transmission 40 above the hitch bar 16. In continuously driven relation with the shaft 41 through the transmission 40, a shaft 42 upstands from said transmission in perpendicular relation with the frame 14 plane and hence in parallel with the axes of the shafts 37 and a pulley 43, preferably grooved for cooperation with V-type belts, is fixed to the upper end of the shaft 42 for rotation therewith immediately above the transmission 40. The pulley 43 is preferably of an axial extent adequate to simultaneously accommodate separate belt drives to the two shafts 37, and each of the shafts 37 is equipped with a pulley 44 fixed to its upper end in coplaner registration with one-half of the pulley 43 face, so that belts 45 engaged with one-half of the pulley 43 face and with one of the pulleys 44 may operate to drive one of the shafts 37, while belts 45 engaged with the other half of the pulley 43 face and with the other of the pulleys 44 operate to simultaneously and correspondingly drive the other of said shafts 37.

An extension A' rearwardly from each bay A of the frame 14 and beyond the base member 13 carries a perpendicularly-related, depending yoke 47 mounted for altitudinal adjustment thereon by means of bolts 50 engaged through selected ones of a vertically-aligned series of holes 51 intersecting the arms of the yoke 47 and with side members of the associated extension, and a roller 48 is journalled at the opposite ends of its axis 48' in bearings 52 fixed to lower ends of the yoke 47 arms, thereby to mount said roller 48 on and to span between the depending arms of the yoke 47 for rotation about an axis paralleling the base member 13. Transversely bridging each yoke 47 above and with its lower margin closely adjacent the periphery of the associated roller 48, a scraper 49 is fixed by means of bolts 53 to lugs 54 outstanding laterally from the yoke arm rear margins, thus to dispose the scraper against the rear margins of the associated yoke in position to maintain the surface of the associated roller clear of soil and vine accumulations. Mounted as shown and described, the rollers 48 serve to partially balance the weight of the apparatus about the axis of the spindles 11, to limit oscillation of the apparatus in one direction about said axis, and to smooth and compact the crop row area over which the operating elements of the apparatus have passed.

Constructed and assembled as shown and described, the improvement is a self-contained unit available for efficient operation when hitched to and power-connected with a conventional tractor. With its hitch bar 16 linked to the towing element of a tractor and its shaft 41 operatively engaged with the tractor power take-off, the apparatus is conditioned for use as a trailing implement tractor-drawn along the crop rows to be worked. By means of the selective adjustments provided, the coulters 28 and points 31' of the stems 31 may be elevated into ground clearance suitable for translation of the apparatus to the field of its use and therein lowered into such ground relation as will operate to side-sever the top growth along the rows spanned by the apparatus and to elevate and direct the severed growth into the orbits of the knives 39 as an incident of apparatus travel along the rows, and the clutch normally associated with the tractor power take-off is available to selectively control operation of the shafts 37 and the knives carried thereby.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. An implement of the character described comprising a frame wheel-supported for translation, altitudinal adjustment, and oscillation in a vertical arc on a single, transverse axle, means for connecting the forward end of said frame to and in trailing relation with a tractor, like coulters operatively depending in laterally-spaced relation from and for simultaneous selective altitudinal adjustment relative to the frame forward portion, forwardly-directed elevating and directing points fixedly depending in spacedly-paired opposition from the frame forward portion inwardly and rearwardly adjacent said coulters, a frame-mounted, end and bottom open, partial housing trailing and centered between each pair of said points to receive the delivery therefrom, altitudinally-spaced bars fixedly spanning each said housing transversely of the frame, a shaft rotatably and centrally intersecting the bars of each said housing perpendicular to the plane of said frame, radial blades on and rotatable with said shaft spacedly adjacent and for cutting cooperation with the housing bars, means for engaging said shaft in driven relation with the power take-off of a frame-towing tractor, and a ground-engaging roller adjustably depending from the frame rearward portion in trailing relation with each said partial housing.

2. An implement of the character described comprising a frame hinged at its rearward portion to, for translation on, and for oscillation in a vertical arc about the offset base member of a single, wheeled, yoke-type, transverse axle, means for selectively adjusting the angular relation between said frame and axle to regulate and determine altitudinal disposition of the frame, a tractor-hitch on the frame forward end, like coulters operatively depending in laterally-spaced relation from and for simultaneous selective altitudinal adjustment relative to the frame rearwardly adjacent said hitch, forwardly-directed elevating and directing points fixedly depending in spacedly-paired opposition from the frame inwardly and rearwardly adjacent said coulters, a frame-mounted, end and bottom open, partial housing trailing and centered between each pair of said points to receive the delivery therefrom, altitudinally-spaced bars fixedly spanning each said housing transversely of the frame and forwardly of the axle hinge connection therewith, a shaft rotatably and centrally intersecting the bars of each said housing perpendicular to the plane of said frame, radial blades on and rotatable with said shaft spacedly adjacent and for cutting cooperation with the housing bars, means for engaging said shaft in driven relation with the power take-off of a frame-towing tractor, and a ground-engaging roller adjustably depending from the frame rearwardly of the axle hinge connection therewith in trailing relation with each said partial housing.

3. The organization according to claim 2, wherein the means for adjusting the angular relation between the frame and axle consists of an arm fixedly upstanding from and radially of the axle yoke base member, a yoke hinged to the upper end of said arm, an internally-threaded swivel block in the yoke free end, a second arm fixedly upstanding from the frame in alignment longitudinally of the implement with and spaced forwardly from said first arm, a screw rotatably mounted and held against axial displacement in the upper end of said second arm in threaded engagement with said swivel block, and means for the selective manual rotation of said screw.

4. The organization according to claim 2, wherein the means for adjusting the angular relation between the frame and axle consists of an arm fixedly upstanding from and radially of the axle yoke base member, a yoke hinged to the upper end of said arm, an internally-threaded swivel block in the yoke free end, a second arm fixedly upstanding from the frame in alignment longitudinally of the implement with and spaced forwardly from said first arm, a screw rotatably mounted and held against axial displacement in the upper end of said second arm in threaded engagement with said swivel block, means for the selective manual rotation of said screw, supplementary arms fixedly upstanding from the axle yoke base member, and retractile springs connecting upper ends of said supplementary arms with points of said frame forwardly thereof from said second arm.

5. The organization according to claim 2, wherein a rock-shaft is journaled on and transversely of the frame forward portion, the coulters are fixed to, similarly depend from, and are spaced apart along said rock-shaft, and a lever fixed to and radially of said rock-shaft latchably cooperates with a toothed segment fixed to the frame for selective regulation of the angular disposition of said rock-shaft relative to its mounting.

6. The organization according to claim 2, wherein the elevating and directing points are constituted from the forwardly-directed, frame-paralleling lower ends of stems fixed to and depending perpendicularly from the frame and tines fixedly and spacedly diverging rearwardly from said ends.

7. The organization according to claim 2, wherein the frame is furnished with at least two laterally and spacedly adjacent partial housings, each of which is comprised from a top closure plate fixed to the frame underside and spaced skirts depending from the plate side margins in general alignment with the path of implement travel to arcuate convergence of their trailing ends.

8. The organization according to claim 2, wherein the frame is furnished with at least two laterally and spacedly adjacent partial housings, a shaft rotatable centrally of each said housing, and each said shaft supports a driving pulley on its upper end above the frame plane, is bearing guided and supported at its intersection with at least one of the housing-spanning bars, and is equipped with laterally-inclined, diametric blades angularly offset relative to each other in an altitudinal spacing along the shaft effective to dispose one of the diametric blades on each side of each of the said bars.

9. The organization according to claim 2, wherein the frame is furnished with at least two laterally and spacedly adjacent partial housings having each a shaft rotatable centrally thereof, and the means for engaging said shafts in driven relation with the power take-off of a tractor comprises a pulley on the upper end of each said shaft above the frame plane, a gear transmission on the frame forward portion, a power input shaft serving said transmission in forward extension therefrom through universal and slip joints whereby it may be operatively connected with the power take-off of a tractor hitch-connected to said frame, a pulley driven by and above said transmission in axial parallelism with the housing-accommodated shafts, a face on said latter pulley coextensive with the faces of both the shaft mounted pulleys, and belts individually connecting the shaft pulleys in driven relation with the transmission-driven pulley.

10. In an implement of the character described having a wheel-supported frame for hitch-connection in trailing relation with a tractor and means for selectively adjusting the altitudinal disposition of the so-connected frame, means for clearing and cutting vine-type top growth from row crops in a field, said latter means comprising laterally-spaced coulters in altitudinally-adjustable dependence from the frame forward portion, forwardly-directed elevating and directing points depending in spacedly-paired opposition from the frame inwardly and rearwardly adjacent said coulters, a frame-mounted, end and bottom open, partial housing trailing and centered between each pair of said points to receive the delivery therefrom, cutter bars fixedly spanning said housings, bladed shafts rotatable in said housings in cutting cooperation with said bars, and means for driving said shafts from the power unit of the frame-hitched tractor.

JULIUS SISHC.

References Cited in the file of this patent
UNITED STATES PATENTS

| Number | Name | Date |
|---|---|---|
| 651,626 | Hord | June 12, 1900 |
| 785,173 | King | Mar. 21, 1905 |
| 933,306 | Elkin | Oct. 26, 1909 |
| 1,020,282 | Hallaway | Mar. 12, 1912 |
| 1,558,568 | St. John | Oct. 27, 1925 |
| 2,114,096 | Noel | Apr. 12, 1938 |
| 2,203,022 | Kamplade | June 4, 1940 |
| 2,208,823 | Walz | July 23, 1940 |
| 2,448,091 | Gardner | Aug. 31, 1948 |
| 2,465,488 | Sears et al. | Mar. 29, 1949 |
| 2,489,204 | Sprick et al. | Nov. 22, 1949 |